Nov. 19, 1968   E. J. KLEINHAMPLE, JR   3,411,570
ELECTRICALLY INSULATED THERMAL DISSIPATOR
Filed May 6, 1966

INVENTOR
Edward J. Kleinhample Jr.
BY
W. L. Stout.
HIS ATTORNEY

United States Patent Office 3,411,570
Patented Nov. 19, 1968

3,411,570
ELECTRICALLY INSULATED THERMAL
DISSIPATOR
Edward J. Kleinhample, Jr., Allison Park, Pa., assignor to Westinghouse Air Brake Company, Swissvale, Pa., a corporation of Pennsylvania
Filed May 6, 1966, Ser. No. 548,143
7 Claims. (Cl. 165—80)

ABSTRACT OF THE DISCLOSURE

The present invention relates to an improved heat transfer mechanism having a heat radiating member exposed to the ambient surrounding, a support member for mechanically carrying and thermally engaging electrical components and a thermal-conductive electrical-insulated epoxy layer securely bonding the radiating and support member in spaced relationship for dissipating thermal energy produced by the electrical components, for reducing the effects of extrenral vibrations and short-term thermal shock on the electrical components and for protecting the electrical components against high voltage transients.

---

My invention relates to an electrically insulated thermal dissipator and more particularly to a heat sink arrangement for efficiently removing thermal energy from electrical heat producing elements while effectively insulating the electrical elements against high voltage transients.

Generally, in electronic apparatus, such as solid-state converters and voltage power supplies, the thermal dissipating qualities are of particular interest since high temperatures or overheating can not only permanently change the parameters and characteristics of the various electrical components but also rapidly damage or destroy the usefulness of the apparatus by either melting or causing thermal runaway of the active elements. That is, in solid-state equipment of this type, it is of the utmost importance to maintain the junction temperature of transistors and other semiconductive elements within their prescribed safe thermal operating limits. Therefore, in order to prevent thermal run-away or mechanical fatigue due to temperature cycling either of which could result in the ultimate destruction of a transistor or a similar semiconductive element, it is generally advisable to decrease and stabilize the junction temperature by utilizing a suitable heat transfer mechanism. Further with the increased use of solid-state apparatus and particularily with the replacement of locomotive motor-generator sets by transistorized DC to DC converters, additional demands are made of the heat transfer mechanisms for not only maintaining the temperature stability but also increasing the electrical reliability of such devices. That is, since locomotives and railway vehicles operate under some of the most adverse environmental surroundings it is not only necessary to improve the thermal power dissipating qualities but also essential to advance the electrical insulating characteristics of the heat transfer mechanism. For example, in a locomotive carried converter, a heat sink must be capable of proficiently transferring internal heat losses to the ambient air as well as protecting the internally located electronic components against high voltage transients which are inherently present in diesel electric locomotives. These high voltage transients or surges are generally produced either naturally by lightning or artifiically by opening a relay coil circuit or similar inductive device and therefore have an amplitude which is well in excess of the normal maximum transistor voltage rating. It is obvious that such high voltage transients or surges can not be tolerated since their presence would result in ultimate destruction of the semiconductive elements and total failure of the converter by causing the semiconductive junction temperature to exceed its maximum thermal capacity. A further impediment encountered by locomotive mounted apparatus originates from the fact that the converter may be exposed to extremely high external temperatures for brief periods of time which could rapidly cause the apparatus to fail, and accordingly special precautions must be taken to insure that such short termed exposures are incapable of damaging or destroying the semiconductive elements of the converter.

While numerous heat sink arrangements have been previously proposed, each of these former proposals lacks the necessary and essential requirements for insuring trouble-free operation under such adverse operating conditions. For example, in the design of conventional heat transfer mechanisms, such as, heat sinks for electronic equipment, the prime concern normally dealt with simply providing a relatively low thermal resistance heat path so that the internal heat losses could be rapidly transferred and dissipated into the surrounding ambient air. That is, in order to perform optimum cooling of the transistors or electronic elements special considerations were generally given to such features as; selection of heat sink materials having high thermal conductivity, external surface preparation of the heat sink for maximum radiation heat transfer, mounting techniques which would result in optimum thermal contact between the surfaces of the element and heat sink, and employment of silicon grease for lubricating the surace contact joint to improve heat transfer characteristics. While on occasion it was desirious to electrically insulate the electronic elements from the heat sink, the usual practice was to merely insert a thin (.003–005 inch) piece of insulating material, such as a mica washer, between the two adjacent surfaces. While such an arrangement provides electrical isolation, it is readily obvious that such practice has several failings which limit the use to electronic apparatus operating in the low and medium power ranges. For example, the insertion of a .500″ mica washer between the surfaces of the element and heat sink increases the thermal resistance of the heat flow path by as much as a factor of ten (10) which is generally intolerable for high power semiconductors. Further, it is quite apparent that the effective isolation provided by such an arrangement restricts its usefulness to only moderate voltage levels due to the minute thickness of the mica washer. Although higher vlotage levels may obviously be handled by simply increasing the thickness of the mica washer, it becomes readily evident that the heat sink soon loses its ability to effectively remove or transfer the internal heat losses of the semiconductive element due to the inverse increase in thermal resistance of the heat flow path caused by oversized washers. A further disadvantage of this type of prior art heat sink is the incessant pos-ibility of burrs penetrating the mica washer which would obviously render even its limited isolating characteristics useless. Clearly heat sinks of this conventional type are incapable of providing the essential and nece-sary qualities for high heat dissipation and high voltage isolation operations.

Accordingly, it is therefore a principal object of my invention to provide a new and improved heat transfer device which efficiently dissipates internal heat losses and effectively provides external thermal and electrical isolation.

Another object of my invention is to provide a unique heat sink arrangement having a low thermal resistance circuit and a high electrical resistance circuit.

A further object of my invention is to provide an improved heat sink arrangement having a high thermal conductive path and a low electrical conductive path.

Yet another object of my invention is to provide a novel heat sink which effectively dissipates the heat losses of internally mounted electronic components to the external surroundings and which efficiently isolates the internally mounted electronic components from externally produced high voltage transients.

Yet a further object of my invention is to provide a new electrically insulated thermal conductive heat sink arrangement which is substantially immune to short term external thermal shock.

Still another object of my invention is to provide a traumatically stable, electrically isolated, thermally conductive heat sink arrangement which provides maximum protection to electronic components against mechanical, electrical and thermal damage.

Still a further object of my invention is to provide a versatile electrical-thermal dissipator including a large external heat dissipating body in the form of an end-bell housing member, an intermediate electrical insulating thermal conductive layer, and an internal heat accepting body for supporting electrical heat producing elements for readily removing internally produced heat to the ambient environmental air and for effectively isolating the electrical elements from high voltage transients.

Still yet another object of my invention is to provide a new and improved heat sink for electronic equipment which is simple in design, economical to manufacture, efficient and reliable in operation, and endurable in use.

Briefly, my invention involves an electrically isolated thermal dissipator assembly or heat sink arrangement for efficiently removing heat energy developed by electrical components contained by an electronic power apparatus and for effectively isolating the electrical components from high voltage transients or surges. The arrangement includes an external primary heat sink member in the form of an end bell for covering an end portion of a suitable housing. The outer face of the primary sink member is provided with a plurality of ribs or fins projecting outwardly therefrom for presenting a spacious heat radiating surface area. The inner face of the primary heat sink member has bonded thereto in spaced relationship at least one secondary heat sink member which mechanically supports and thermally contacts the electronic heat producing components of the power apparatus. The bonding material forms a pre-established dielectric interface or layer and consists of an epoxy resin having a thermal conductive filler which provides a relatively low heat resistance flow path.

I shall describe one form of a heat transfer mechanism embodying my invention and shall then point out the features and advantages thereof in the appended claims.

The above objects and other attendant features and advantages of my invention will become more fully evident from the following detailed description when considered in connection with the accompanying drawings wherein.

Figure 1:
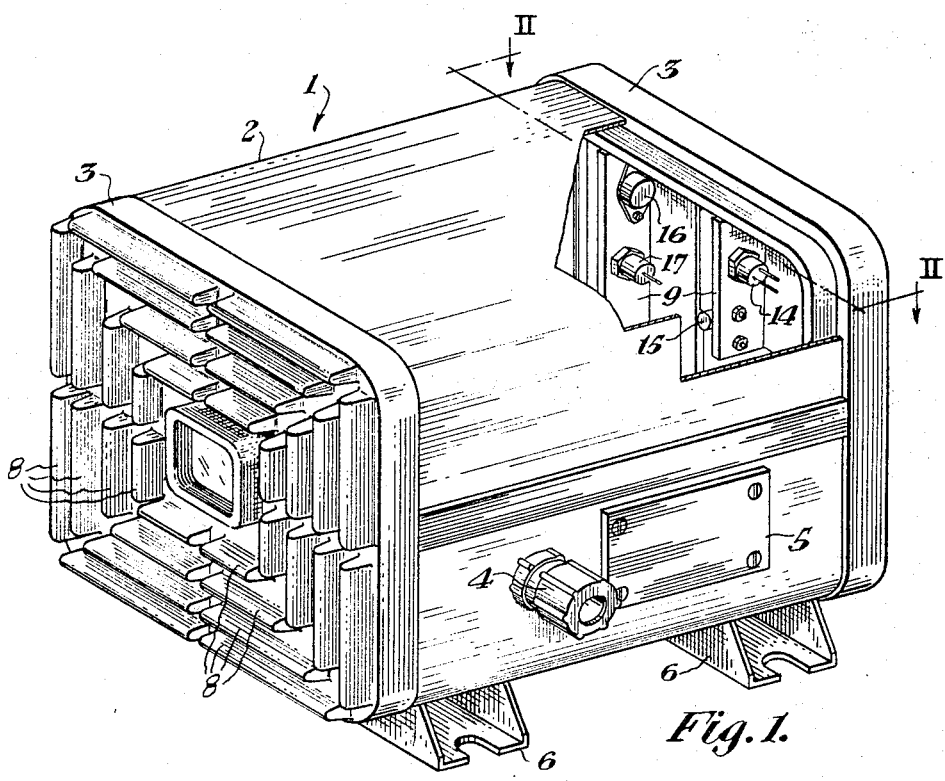
FIG. 1 is a perspective view, having a portion of the housing removed, of a DC to DC converter utilizing the heat transfer mechanism embodying my invention.

Referring to the drawings, and particularly to FIG. 1, the character 1 designates a case or housing which is preferably formed of a suitable material, such as aluminum, for example. As will be discussed in more detail hereinafter, the case 1 serves both as an air-tight enclosure for protecting the internally located components of the converter against damage or exposure from dirt, dust, moisture, etc. as well as a heat sink member for dissipating the internally produced thermal energy to the surrounding ambient air. The box-like case or housing 1 comprises an intermediate portion 2 in the form of an upper and a lower elongated channel member and a pair of rectangular end bells 3 covering each end portion thereof. The upper channel member of the intermediate portion 2 is removably secured, in any suitable manner, to permit ease of access to the electrical components for maintenance and replacement purposes. The lower channel of the intermediate portion 2 is provided with a conventional cable or conduit connector 4 for accommodating the necessary electrical leads or wires. A terminal cover plate 5 is also secured, for example, by means of suitable screws (not characterized), to the lower channel of the intermediate portion 2 and readily provides access to the electrical input and output terminals of the converter. A pair of supporting feet or brackets 6 are provided on the underside of casing 1, as viewed in FIG. 1 for mounting purposes. These supports are so proportioned and dimensioned to be compatible with existing mountings of motor-generator sets so that replacement may be achieved with ease and convenience. It should be understood that while the preferred method of mounting a motor-generator replacement would normally be on a horizontally disposed base-frame, the case or housing is so constructed and the internal components so fabricated that the converter may be mounted in any desirable manner, for example, vertically or horizontally. Further, while the housing is preferably constructed of aluminum for increased strength and durability, it is understood that other materials, for example, plastic, may be used for the channel members of the intermediate portion 2. Likewise, it should be understood that while it is advantageous to employ aluminum for the end bells 3 due to cost and weight considerations, other metals having comparable heat dissipating characteristics and high thermal conductivity may be employed with effective results. Similarly, the specific configuration of the casing 1 is not of particular importance, with exception that the end bells or portions should be provided with a sufficient amount of radiating surface area, and therefore the housing may assume any convenient form.

Figure 2:
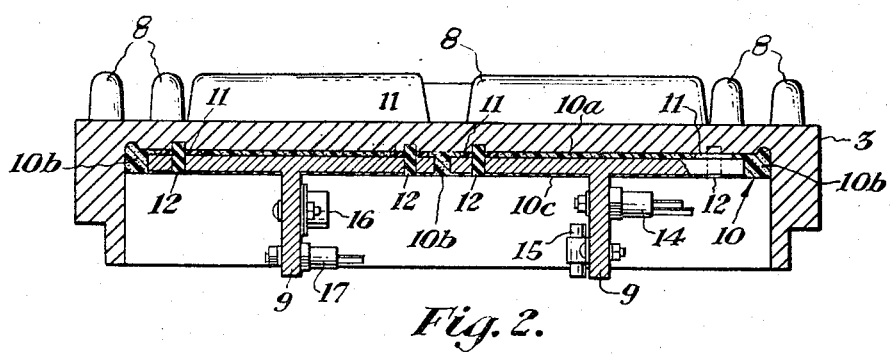
FIG. 2 is an enlarged sectional view taken along lines II—II of FIG. 1 illustrating the heat transfer mechanism embodying my invention.

The two end bells 3 which form the exterior end portions and the primary heat sinks of the electrically insulated thermal dissipator are generally of substantial identical construction for the purpose of ambidexterity and each preferably consists of a substantially dish-shaped casting, as shown in the cross-sectional view of FIG. 2. The exterior face of each end bell is provided with a plurality of outwardly extending elongated ribs or fins 8 for furnishing a large radiating surface area to the surrounding ambient air. While the elongated radiating fins 8 are shown as consisting of a plurality of concentric equilateral tetrahedrons, it is readily obvious that other shapes and various configurations of radiators may be employed with equal success. As illustrated in the drawings, the end bell or primary heat sink 3 is shown having two secondary heat sink members 9 fixedly secured to the internal flat surface of the end bell. Each of the secondary heat sinks 9 is preferably an extruded member having a T-shaped cross section and composed of aluminum or similar thermal conducting material. While only two secondary heat sinks are illustrated in the drawings, it is obvious that the number of secondary heat sinks as well as their lengths are variable factors which are normally dictated by the power handling requirements and the number of heat producing elements to be heat-sinked. Both of the flat surface areas of the crosspiece forming the T-shaped secondary heat sinks are disposed adjacent the inner flat surface of the primary sink 3 and are suitably bonded thereto in space relationship by means of an epoxy resin or adhesive 10. Preferably, the epoxy resin should have such features as; a high dielectric constant or high voltage puncture strength, a good adhesive and bonding quality, and contain a heat conducting filler, such as 50% by weight of silica for improving its thermal conductivity. An example of a suitable commercially available adhesive material having high thermal conductivity, excellent dielectric strength, and a coefficient of thermal expansion comparable to that of aluminum and copper is sold by Wakefield Engineering, Inc. under the trade name "Delta Bond 152."

In reviewing FIG. 2, it is readily noted that the epoxy material or resin forms an interface or layer 10a between the adjacent surfaces of the primary heat sink 3 and the secondary heat sinks 9. For good thermal conduction and excellent voltage isolation, the epoxy interface or layer 10a should have a thickness of approximately .030 to .040 inch. As shown, a plurality of creepage paths 10b having breadths of approximately 1/8 to 3/16 inch are provided between the adjacent sides of the secondary heat sinks 9 as well as between the contiguous sides of the secondary and primary heat sinks in order to provide adequate isolation therebetween. As shown, the desirable thickness of the layer 10a and the appropriate widths of the creepage path 10b are obtained by suitable placement of a plurality of washers or spacers 11 and dowels or locators 12. Preferably the spacers and locators are concentrically mounted and are suitably positioned in guide holes, not characterized, formed in the internal surface of the primary heat sink 3. Matching through holes are drilled in, for example, each of four corners of the crosspiece of the secondary heat sinks 9 for accommodating the free ends of the locators 12. Accordingly, the relative positions of the primary and secondary heat sinks are preestablished so that the proper thickness and breadth of the epoxy material are easily and accurately attained. Further, it is also advantageous to permit or allow a thin film 10c (0.010 inch) of epoxy resin to cover the exposed surfaces of the crosspiece of the secondary heat sinks 9.

The general method of assembling appears self-explanatory, however, an exemplary process could involve the following steps:

(1) Placing the secondary heat sinks in appropriate relationship with respect to the internal flat surface of the primary heat sink which is easily performed due to the preestablished placement of the spacers 11 and locators 12, (2) Heating the assembly to a suitable temperature (80° C.)

(3) Pouring a sufficient amount of evacuated filled epoxy resin to thoroughly permeate the gaps existing between the heat sinks and to provide a thin film covering the exposed surfaces of the secondary heat sinks and (4) Curing the thermal-setting plastic at, for example, 100° C., for 16 hours for providing a solid integral structure. It will be understood that the foregoing example is intended as illustrative only, and other operations and process steps may be employed and required with equal success for other numerical values and different materials.

After the epoxy has been sufficiently cured so that a relatively firm and nonfringible, having a certain degree of elasticity, bond is provided, the assembly is available for use. In the illustrated converter, the web portion of each of the T-shaped secondary heat sinks 9 is shown carrying various electrical and electronic heat producing components. For example, the web portions are illustrated as suitably supporting a silicon controlled rectifier 14, a power resistor 15, a power transistor 16, and a diode rectifier 17, the electrical interconnections of which are shown for the purpose of clarity. As is conventional, suitable apertures extending through each of the web portions of the respective secondary heat sinks 9 are provided for accommodating the stud-type mounted elements 14 and 17. Similarly, the web portions also include through fastening holes for the header-type mounted element 16 and band-type case mounted element 15. To improve the thermal conductivity between the heat producing elements 14, 15, 16, and 17 and the contacting surface of the secondary heat sink web, it is advantageous to apply suitable silicon grease to these adjoining surfaces before assembling.

In operation the heat produced by the electrical components 14, 15, 16 and 17 is transmitted through the thin film of silicon grease to the respective secondary heat sinks 9. The thermal energy is rapidly conducted by the secondary heat sinks 9 and appears on the bordering surface of the interface or epoxy layer 10a. The heat is quickly conducted and transferred by the epoxy and filler to the adjacent surface of the primary heat sink 3. The transferred heat is rapidly conducted to the surface area of the fins wherein it is promptly dissipated into the surrounding ambient air by radiation and either natural or forced convection heat transfer. Accordingly, the internally generated heat losses are rapidly and efficiently transferred to the external air so that the junction temperature of the semiconductive elements are safely maintained within their maximum power dissipating ratings. The cooling ability of the present arrangement may be enhanced by painting or anodizing the surfaces of the radiating fins which improves the surface emissivity. Further, for optimum cooling the surface area of the fins are designed to have at least five times the combined contiguous surface area of the secondary heat sinks 9.

The large surface area of the fins of the primary sink also function as a thermal delay for preventing thermal energy from being transferred to the internally mounted elements when the converter is exposed to a short-termed high temperature source such as, an open furnace in an open hearth operation. It is assumed that the exposure period and the finite amount of time required in heating the massive primary heat sink having an external irregular surface are unequal. That is, the end bell is so proportioned that in most cases the period of exposure to an external heat source will not exceed the time necessary for causing a reverse heat transfer process to ocur so that the external thermal energy is prevented from affecting the internally mounted electrical components.

Further, the high dielectric constant and good insulating quality of the epoxy layer effectively isolates the electrical components against high voltage transients or surges which might be transmitted through ground to the converter housing.

In actual practice the assembly was tested and subjected to voltages in excess of 3,000 volts A.C. with successful results. In fact, the insulating qualities and dielectric constant of the epoxy are well in excess of the test voltage and actually the heat sinked elements may be safely isolated from transient voltages having an amplitude as high as 10,000 volts. It has been found that an assembly having the characteristics and parameters as mentioned above is capable of dissipating approximately 30 watts of power to the surrounding ambient air with a maximum thermal drop from the heat producing elements to the ambient air of approximately 20° C. To operate satisfactorily the epoxy interface for layer 10a should preferably limit the thermal gradient existing between the primary and secondary heat sinks to approximately 15° C. It is understood that the numerical values and the physical dimensions of a particular heat sink or transfer assembly is dictated principally by its intended use and specifically by the thermal dissipation and voltage isolation requirements.

As it is readily apparent from the above, a unique feature of the presently described heat transfer mechanism is the provision of mounting the electrical components within a protective housing which materially reduces and substantially eliminates the possibility of damage due to external causes.

Another feature of the heat sink arrangement in accordance with my invention is a provision of utilizing an external housing member for efficiently dissipating internally produced heat.

Yet another feature of the heat transfer assembly in accordance with my invention is the ability of the epoxy bond to efficiently conduct thermal energy, effectively insulate against high voltage transients, and efficaciously reduce the effects of external vibrations on the internally mounted components due to its elastic qualities.

Still yet another feature of the heat transfer mechanism in accordance with my invention is the provision of employing similar primary heat sinks as well as substantially identical secondary heat sinks which not only materially reduces the initial manufacturing cost but also substantially decreases any maintenance and replacement expenditures.

Although I have shown and described my invention in relation to a DC to DC converter, preferably employed in replacing a train carried motor-generator set, it is readily evident that the invention is not merely limited thereto but may be utilized in other apparatus as well as in other environmental suroundings which have need of my invention.

Further it will be appreciated that various deviations of size, configuration and numerical values and dimensions are well within the purview of my invention.

Similarly, although I have herein illustrated and described only one form of the apparatus embodying my invention, it is understood that various changes and modifications may be made therein within the scope of the appended claims without departing from the spirit and scope of my invention.

Having thus described my invention what I claim is:

1. An electrical insulative thermal dissipator for an electrical apparatus comprising: a metallic rectangular end-bell member forming a portion of the housing of the electrical apparatus, said metallic rectangular end-bell member having a plurality of fins extending outwardly from the outer surface thereof, said plurality of fins forming concentric tetrahedrons for providing a larger surface area to the ambient surrounding, a metallic T-shaped supporting member having means for detachably mounting an electrical component of the electrical apparatus to the web portion of said metallic T-shaped supporting member and having the crosspiece of said metallic T-shaped supporting member spaced from the inner surface of said metallic rectangular end-bell member, and a layer of epoxy resin having a heat conducting filler securely bonding the crosspiece of said metallic T-shaped supporting member to said inner surface of said metallic rectangular end-bell member wherein the thermal energy produced by the electrical component is transferred from said metallic T-shaped supporting member through said layer of epoxy resin to said plurality of fins of said metallic rectangular end-bell member for dissipation to the ambient surrounding.

2. An electrical insulative thermal dissipator as defined in claim 1, wherein a plurality of insulative dowels and washers cooperate with said crosspiece of said metallic T-shaped supporting member and said inner surface of said metallic rectangular end-bell member for positioning said metallic T-shaped supporting member with respect to said metallic rectangular end-bell member and for determining the thickness of said layer of epoxy resin.

3. A heat sink for electrical apparatus comprising, a metallic end-bell member forming a portion of the housing for the electrical apparatus, said metallic end-bell member being dish-shaped and having a plurality of elongated symmetrically disposed outwardly extending fins forming a large radiating surface area to the ambient surrounding, a metallic supporting member having an inwardly extending portion for detachably carrying electrical components of the electrical apparatus and having a substantially flat heat transfer surface area, and an electrical-insulative thermal-conductive layer of epoxy resin having a conductive filler securely bonding the flat heat transfer surface of said metallic supporting member in spaced relationship to the inner surface of said metallic end-bell member whereby the heat generated by the electrical components is conveyed to said metallic supporting member through said electrical-insulative thermal-conductive layer of epoxy resin to said metallic end-bell member for dissipation to the ambient surrounding.

4. A heat sink as defined in claim 3, wherein a plurality of insulative dowels pass through holes in said metallic supporting member and engage guide holes in the inner surface of said metallic end-bell member for suitably locating said metallic supporting member with respect to said metallic end-bell member.

5. A heat sink as defined in claim 4, wherein an insulative washer is disposed around each of said plurality of insulative dowels for establishing the thickness of said electrical-insulative thermal-conductive layer of epoxy resin between the flat heat transfer surface of said metallic supporting member and the inner surface of said metallic end-bell member.

6. A heat sink as defined in claim 3, wherein said metallic end-bell member is square shaped and said plurality of fins form concentric tetrahedrons.

7. A heat sink as defined in claim 3, wherein said epoxy resin forms a thin film for covering the exposed surface of the flat heat transfer surface of said metallic supporting member.

References Cited

UNITED STATES PATENTS 2,994,203  8/1961  Lackey et al.
3,103,587  9/1963  Ure, Jr., et al.

MEYER PERLIN, *Primary Examiner.*

CHARLES SUKALO, *Assistant Examiner.*